United States Patent
Wagenblast et al.

[15] 3,656,644
[45] Apr. 18, 1972

[54] AGRICULTURAL AND OTHER VEHICLES

[72] Inventors: Ernst Wagenblast, Singen; Heinz Hohlwegler, Gottmadingen, both of Germany

[73] Assignee: Maschinenfabrik Fahr Aktiengesellschaft, Gottmadingen, Germany

[22] Filed: Jan. 28, 1970

[21] Appl. No.: 6,458

[30] Foreign Application Priority Data

Feb. 5, 1969 Germany ................... P 19 05 665.6

[52] U.S. Cl. .......................... 214/390, 254/122, 296/35 A
[51] Int. Cl. ................................................. B60p 1/64
[58] Field of Search ............... 214/390, 502, 512, 515; 296/35 A; 254/8, 9, 10, 122; 298/23 A, 23 B, 2, 3, 12, 14, 38

[56] References Cited

UNITED STATES PATENTS

| | | | |
|---|---|---|---|
| 1,985,169 | 12/1934 | Howell et al. | 214/502 |
| 3,083,850 | 4/1963 | Owen | 214/390 |

FOREIGN PATENTS OR APPLICATIONS

| | | | |
|---|---|---|---|
| 203,878 | 11/1958 | Germany | 214/390 |
| 1,236,351 | 3/1967 | Germany | 214/390 |

Primary Examiner—Albert J. Makay
Attorney—Karl F. Ross

[57] ABSTRACT

A vehicle for transporting containers has a bifurcate frame with a pair of parallel, generally horizontal bars as its prongs, these bars being articulated to hydraulically operable scissor linkages by which they may be raised and lowered together with a container overhanging the bars by its rim. Either or each bar carries a pivoted latch to hook onto a lateral projection on the container when the beams are elevated by the extended linkages, a collapse of the linkages to lower the beams causing one of the links thereof to retract the latch into an inoperative position, thereby releasing the container.

3,378,155  4/1968  Steiner ............................ 214/390

8 Claims, 5 Drawing Figures

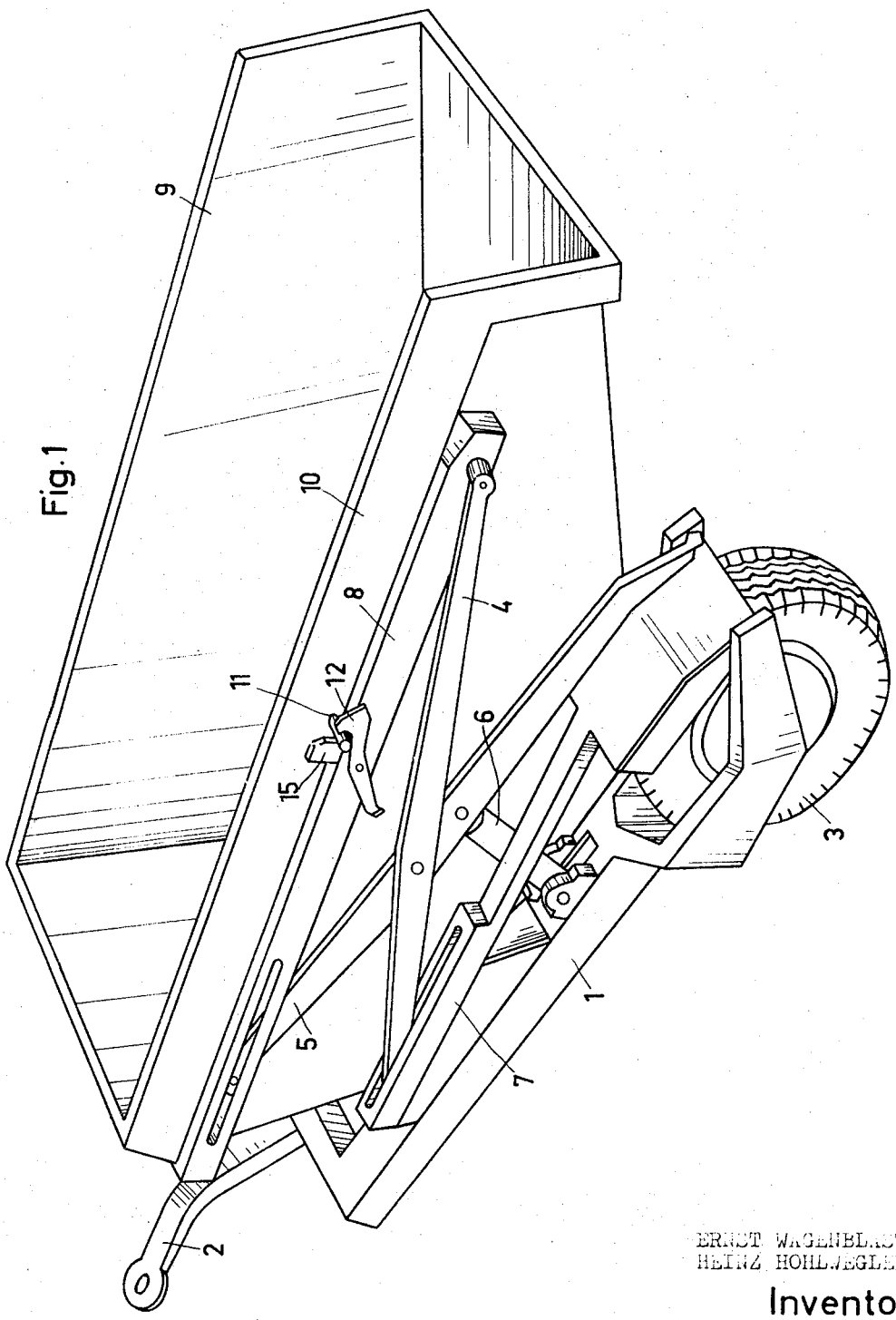

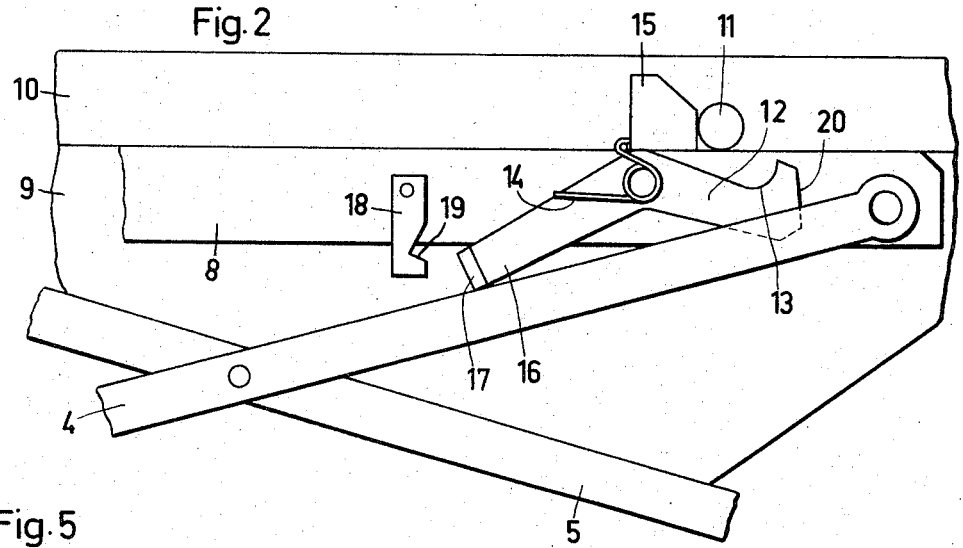
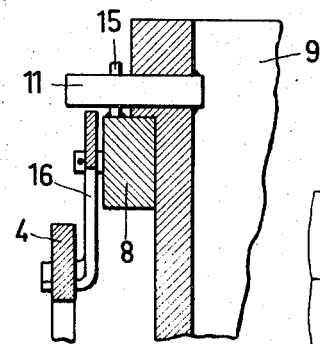
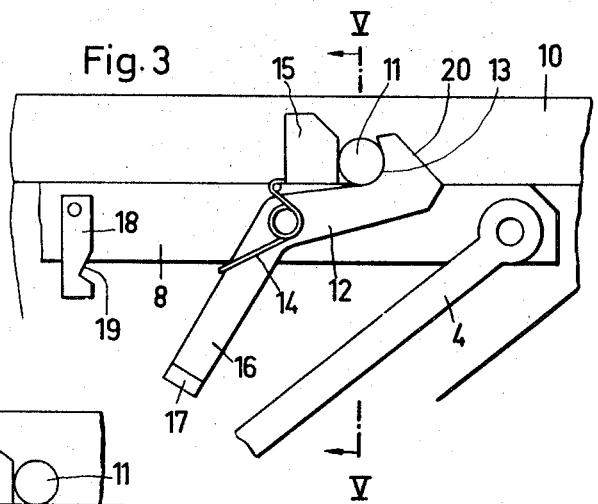
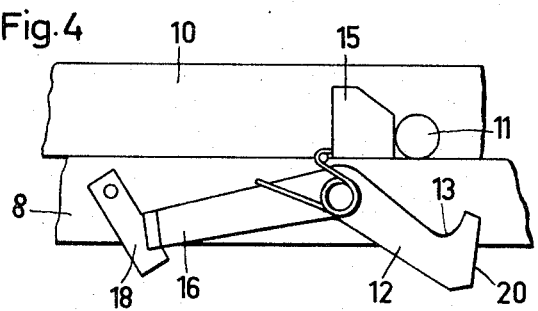

AGRICULTURAL AND OTHER VEHICLES

Our present invention relates to vehicles, particularly for agricultural purposes, adapted to pick up containers from stacks or from the ground and to deposit them again, using linkages arranged on two sides of a fork-shaped vehicle.

In accordance with the invention we provide a vehicle comprising a fork-shaped frame adapted to bracket a container in a resting position so that a pair of scissor linkages on opposite sides of the frame come to straddle the container, these linkages being displaceable by fluid-operable jacks for lifting the container; at lease one of the linkages bears a latch for engaging a coacting projection or catch, e.g., a pin, on the corresponding side of the container to hold it against a stop on the frame, the latch being positioned in the path of movement of one of the members of the linkage for deactivation in a collapsed position of the frame.

Preferably each latch is swingable in a vertical plane by being pivotally mounted on an elevatable, generally horizontal longitudinal beam or bar fitting under a laterally projecting rim on the container. The latch can be provided with a biasing spring which, upon upward extension of the linkage, urges the latch into an operative position from which it may be manually released and in which the coacting projection fits into a recess in the latch.

Thus the container is automatically locked at the beginning of a raising motion and is automatically released at the end of a lowering operation.

In order to hold the latch in a deactivated position independently of the position of the associated linkage, a pivoting detent is provided on the adjacent longitudinal beam which prevents swinging of the latch in response to the loading force of the spring.

In order for the container to be capable of being automatically locked even with the linkage partly or fully extended, the latch is provided with a ramp surface which causes it to be cammed out of the way by the projection or catch on the container when the latter moves longitudinally along the frame, the latch being thus swung back against the force of the spring until the bolt comes to lie in the recess of the latch and the latter is restored to its operating position.

Further features and details of the invention will be gathered from the following description making reference to the accompanying drawing which shows one embodiment of the invention and wherein:

FIG. 1 is a perspective view of a vehicle with a load-carrying container in accordance with the invention;

FIG. 2 is an enlarged side view of means for locking the container in place, shown in a retracted position;

FIG. 3 shows the locking mechanism of FIG. 2 in an operative position;

FIG. 4 shows the locking arrangement of FIG. 2 after the latch has been deactivated by hand; and FIG. 5 is a section on the line V—V of FIG. 3.

The diagrammatic drawing shows an agricultural container-transporting vehicle comprising a frame 1 and a tow bar 2 for attaching the vehicle to a tractor. The frame 1 is fork-shaped and the free ends of the two fork limbs or prongs are provided with respective wheels 3. Each prong carries a lifting linkage formed by two intersecting links 4 and 5 which are displaceable by an associated hydraulic jack 6. The ends of the links 4 and 5 are articulatedly connected with lower longitudinal beams 7 and with upper longitudinal beams 8 so as to allow a pivoting and sliding movement. The upper longitudinal beams 8 serve for supporting a container 9 which has a laterally projecting rim 10 resting on the upper surfaces of the longitudinal beams 8.

The two side rims 10 of the container 9 are provided with catches in the form of bolts 11. On each upper longitudinal beam 8 a latch 12 is pivoted and has a recess 13 which receives the associated bolt 11 and stops a rearward displacement of the container 9 along the beams. A spring 14 urges the recess 13 toward the bolt 11. A fixed stop 15 on the beam 8 checks movement of the container 9 in the other direction, i.e., toward the front.

The latch 12 is in the form of a bell crank whose hook-shaped forward end defines the recess 13 and whose rear end is in the form of an actuating arm 16. In the locking condition of the latch 12 the actuating arm 16 extends obliquely downward. The end 17, which is bent outwardly away from the container perpendicularly (as seen in FIG. 5) to the actuating arm 16, extends into the path of movement of the articulated link 4.

The manner of operation of the arrangement is as follows.

In the lowered position of the two linkages the bent-over end 17 of the actuating arm 16 abuts against the upper edge of the member 4 of the linkage. The latch 12 is then swung so far against the force of the spring 14 that the hook defining its recess 13 lies below the upper edge of the longitudinal beam 8. The fork-shaped frame 1 of the vehicle is now backed up to the container 9, resting on the ground, and surrounds it on three sides. The longitudinal beams 8 then fit under the rim 10 of the container 9. The upper face of the longitudinal beam 8 slides underneath the container 9 until the stop 15 on the beam 8 strikes against the bolt or stud 11 fixed to the container 9. The lifting jacks 6 are then switched on and the lateral linkages engaging the container are raised. In the course of this raising action the upper edge of the link 4 separates from the actuating arm 16 of the latch 12. The latch 12 is swung by the force of the spring 14 in a counterclockwise direction and engages the bolt 11 which thereupon enters the recess 13. Consequently the container 9 is locked so that it cannot move in relation to the longitudinal beam 8. On depositing the container on the ground the opposite procedure occurs. As soon as the bar 8 has risen to a level at which the upper edge of the scissor member 4 strikes the depending actuating arm 16 to trip the latch 12, the container 9 is automatically released.

In order to be able to release the container 9 independently of the movements of the scissor link 4, a pivoting detent 18 is provided on the longitudinal beam 8 for cooperation with the actuating arm 16. First the latch 12 is moved by hand until the stud or bolt 11 forming the catch of the mechanism is released. The outwardly bent end 17 of the actuating arm 16 is moved and fitted into a notch 19 of the detent 18 so as to hold the latch 12 cocked back in an inactive position as shown in FIG. 4. The manually cocked latch 12 is automatically released on lowering the linkage, owing to the movement of the link 4. On raising the actuating arm 16 by the movement of the link 4, the detent 18 is released and swings downwardly under its own weight. In the extended position of the lifting linkage the latch 12 must be manually uncocked for locking the container 9.

If a container is to be picked up from a raised level, as for instance in the case of a stack of containers, the linkage must be correspondingly elevated so that the hook of latch 12 rises above the bar 8. In order to bring about an automatic locking of the container 9 upon its transfer to the vehicle, the latch 12 has a leading ramp surface 20 on its hooked end in front of the recess 13. As the container slides along the bar 8, its bolt 11 cams aside the latch 12 by engaging the ramp surface 20 and thereafter comes to rest against the stop 15. Thus, the latch 12 is swung in the clockwise direction and finally is snapped into position behind the bolt 11 by the spring 14. The container is thus locked.

We claim:

1. A vehicle for transporting containers, comprising:
   a bifurcate frame with a pair of prongs each including a generally horizontal bar and a scissor linkage articulated to said bar beneath the latter;
   fluid-operable means for collapsing and extending said linkage to lower and raise the associated bar;
   a container having an overhanging rim resting on said bar, said rim being provided with a projection extending therefrom;
   a latch movably mounted on said bar for coacting engagement with said projection; and
   actuating means for moving said latch independently of said linkage from an inoperative position to an operative position upon elevation of said bar by said linkage, said latch having a formation engageable by a member of said linkage upon a collapse thereof for retracting said latch into its inoperative position.

2. A vehicle as defined in claim 1 wherein said actuating means comprises spring means urging said latch into its operative position.

3. A vehicle as defined in claim 2, further comprising detent means on said bar for arresting said latch in its inoperative position against the force of said spring means.

4. A vehicle as defined in claim 2 wherein said latch has a hooked end engageable with said projection and provided with a leading ramp surface extending into the path of said projection in said operative position for camming engagement therewith to facilitate a sliding of said rim onto said bar.

5. A vehicle as defined in claim 1 wherein said latch is pivoted to a side of said bar for swinging in a vertical plane.

6. A vehicle as defined in claim 5 wherein said linkage comprises a pair of intersecting links articulated to each other, said member being one of said links.

7. A vehicle as defined in claim 6 wherein said latch is a lever having a hooked first arm engageable with said projection and having a depending second arm with a bent-over extremity constituting said formation, said extremity coming to rest on said one of said links upon a raising of said bar to a predetermined level.

8. A vehicle as defined in claim 1, further comprising stop means on said bar for halting said projection in a position of engagement thereof by said latch.

* * * * *